United States Patent [19] Braudy et al.

[11] 3,978,247
[45] Aug. 31, 1976

[54] TRANSFER RECORDING PROCESS
[75] Inventors: Robert Stewart Braudy, Cherry Hill; Hamilton Harvey Roberts, Jr., Trenton, both of N.J.
[73] Assignee: RCA Corporation, New York, N.Y.
[22] Filed: Jan. 28, 1974
[21] Appl. No.: 436,930

[52] U.S. Cl. ................................. 427/43; 8/2.5 R; 346/76 L; 427/53; 427/146; 427/271; 428/913
[51] Int. Cl.² ........................................ D06P 1/00
[58] Field of Search............. 117/37 R, 38, 3.1, 3.4, 117/35.6; 8/2.5; 346/76 L; 427/43, 53, 256, 271, 146, 148, 288; 428/913; 96/27 R, 29 R

[56] References Cited
UNITED STATES PATENTS
3,476,578  11/1969  Brinckman........................ 117/36.2
3,481,760  12/1969  Clark et al......................... 117/36.2
3,655,379  4/1972   Gundlach.............................. 96/27
3,745,586  7/1973   Braudy............................. 117/37 R OTHER PUBLICATIONS
Woodward, "Distillation Printing," IBM Technical Disclosure Bulletin vol. 9, No. 11, Apr. 1967.

Primary Examiner—Thomas J. Herbert, Jr.
Assistant Examiner—Bruce H. Hess
Attorney, Agent, or Firm—Glenn H. Bruestle; Arthur E. Wilfond; William S. Hill

[57] ABSTRACT

A method of transfer recording comprising selectively irradiating a binderless dry film consisting essentially of a dye or pigment capable of absorbing energy and being vaporized without decomposition.

4 Claims, 3 Drawing Figures

TRANSFER RECORDING PROCESS

BACKGROUND OF THE INVENTION

One of the uses for the recording material of the present invention is in laser beam recording.

Due to its coherence, the laser shows prospects of becoming a basic tool in the field of information transmission. As an energy source, it is compatible with intensity modulator requirements. Furthermore, electro-optical/mechanical deflection of laser radiation can be accomplished, with good positioning, at extremely high rates of speed.

It has been found possible, via the selective application of laser radiation, to create an image on a material adapted to receive the same. Basically, this is accomplished by positioning the material to receive the image adjacent to the coated surface of a thin film carrier, the coating being a transferable, colored, ink-like substance. When the uncoated surface of the carrier is irradiated with laser radiation, the portion of the colored coating opposite the irradiated area is transferred from the carrier to the receiving material.

In the past, recording material has been used which includes a binder since the binder was thought necessary to hold the colored substance on the carrier film. However, it was observed that the presence of the binder substantially reduced the speed of transfer of the recording material from the carrier substrate to the recording element. This, in turn, lowered the maximum recording speed below that ultimately desired.

Later it was found that increased recording speed could be achieved if a binderless coating of recording material was utilized, with the coating being deposited by an evaporation technique. But the evaporation method is relatively expensive and not suitable for coating long lengths of wide carrier tape.

It has now been found that quite satisfactory recording material for transfer recording, not only by laser beam, but also by other forms of energy absorption and even for contact printing, can be prepared by depositing a binderless coating of a suitable dye or pigment on a carrier substrate film from a solvent solution or suspension. Adherence to the substrate can be entirely adequate for the intended purpose and the coating can be made tough enough so that it does not readily rub off when subjected to ordinary handling.

Some publications which may be referred to for background information regarding the laser-writing technique, include:

Roshon, D. C., and Young, T., "Printing by Means of a Laser Beam," IBM Technical Disclosure Bulletin, Vol. 7, No. 3, August 1964;

Woodward, D. H., "Distillation Printing," IBM Technical Disclosure Bulletin, Vol. 9, No. 11, April 1967.

THE DRAWING

DESCRIPTION OF PREFERRED EMBODIMENTS

Figure 1:
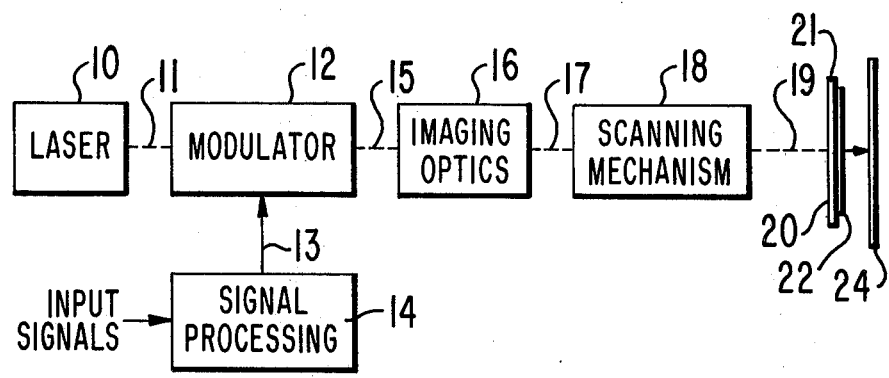
FIG. 1 is a block diagram of a laser recording apparatus.

First, a brief description will be given of one form of apparatus in which the recording material of the present invention is intended to be used. As shown in FIG. 1, a light modulator 12 accepts the laser beam 11 emitted by a laser 10 and modulates its intensity in response to the input signal 13 generated by signal processing means 14. The modulator 12 may be of the type which uses electro-optic crystals to effect the polarization of the laser beam as a direct function of the applied signal voltage. Polarization modulation is then converted into intensity modulation by a polarization analyzer attached to the modulator. Beam-enlargement and spot-forming optics, i.e. the imaging optics 16, then increases the diameter of the intensity modulated laser beam 15 until it fills the desired aperture of the imaging lens. The convergent cone of light 17 leaving the imaging lens may then be intercepted by a scanning mirror incorporated within the scanning mechanism 18. Scanning may be accomplished by rotating a multifaced mirror in precision air bearings with a direct-drive servo motor. Thus, the converging cone of light 19 directed by the scanning mechanism 18, is repetitively swung through an arc to produce an active scan on the uncoated surface 20 of a thin film substrate 21; the opposite surface of the substrate being coated with a vaporizable energy-absorbing dye 22. Spaced adjacent to the coated surface 22 of the substrate is a material 24 adapted to receive the transferred image created. As the uncoated surface 20 of the carrier is selectively irradiated by the intensity modulated beam 19, via the scanning mechanism 18, the coating opposite the irradiated area is transferred from the substrate to the adjacent spaced material 24.

The argon laser emits in the blue-green region of the visible spectrum, principally at 0.4880 $\mu$m. The $CO_2$ laser emits primarily at 10.6 $\mu$m. The Nd:YAG laser emits principally at 1.06 $\mu$m. The entire visible spectrum extends from 0.4 $\mu$m to 0.7 $\mu$m.

It is necessary that the dye or pigment which is used for the recording material be capable of absorbing sufficient energy from the energy source which is used, to vaporize instantaneously without being decomposed. Not all dyes or pigments that are capable of absorbing radiant energy of a particular wavelength make suitable transfer recording materials. To serve as a suitable recording material, the dye or pigment must also have proper thermal characteristics. That is, the recording material should have low thermal conductivity, low density and low specific heat. The material should also have a low vaporization temperature, vaporization over a narrow temperature range (i.e. less than 30° C) and small heat of vaporization.

The thickness and density of the colorant coating affect transferability. Poor transfer results if the colorant layer is either too thick or too thin.

A more thorough understanding of the general mechanics of transference will be derived upon reading the following articles, i.e.:

Ready, J. F., "Effects Due to Absorption of Laser Radiation," Journal of Applied Physics, Vol. 36, No. 2, February 1965; and Ready, J. F., Bernal, E. G., and Sheperd, L. T., "Mechanisms of Laser-Surface Interactions," Honeywell Corporate Research Center, November 1967.

The present invention is related to an improvement in the method of making a recording material which can be used in the transfer recording process which has been described above, and in other recording processes. It has now been found that dyes or pigments capable of absorbing sufficient energy from the beams of one or more types of lasers and other energy sources to vaporize the dye or pigment without decomposition, can be coated on suitable transparent substrate films from solvent solutions or suspensions without any binder being present, and the resulting dye or pigment-coated product can be satisfactorily used in the recording process.

Figure 2:
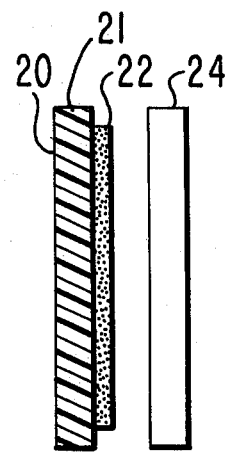
FIG. 2 is an enlarged section view of the recording material portion of the apparatus of FIG. 1.
Figure 3:
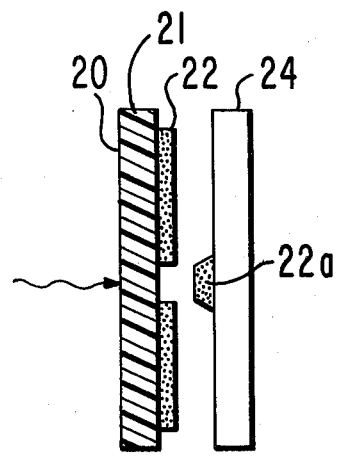
FIG. 3 is the same view as FIG. 2 after transference of a portion of recording material.

For example, as illustrated in FIG. 2, a transparent substrate 21, which may be a film of polyethylene, may be coated with a layer 22 of a dye such as Rhodamine B Ex. In the recording process, the dye layer 22 is adjacent to a recording substrate 24 which may be paper, for example.

Any one of several conventional solution or colloidal suspension coating methods may be used to coat the dye (or pigment) layer 22 on the film substrate 21. A solution is prepared by dissolving (or dispersing) 0.1 g of dye (or pigment) per 2 ml of solvent and the solution is applied evenly to the film 21 using a spray gun or a wire-wound rod. In the case of pigments, the composition is usually a colloidal suspension rather than a solution. The solvent is then permitted to evaporate. Adhesion of the dye or pigment is improved in the case of a substrate such as polyethylene, if the polyethylene film is treated with a corona discharge or other surface treatments prior to coating.

Certain solvents are more effective with some dyes than with others. For example, anhydrous isopropyl alcohol has been found to be a good solvent for Rhodamine B Ex. Methyl ethyl ketone is a good dispersant for 1,5-diaminoanthraquinone and 1,2-diaminoanthraquinone.

Some solvents are effective with many different dyes and pigments. In the following Table, the same solvent, TR-590 (a standard denatured alcohol made up of 5 parts by vol. wood alcohol spirits and 100 parts by vol. 190 proof ethanol, each 100 parts by vol. of the mixture also containing 1 part by vol. methyl isobutyl ketone, 1 part 85–88% ethyl acetate, 1 part gasoline) was used in all cases, and the proportion of dye (or pigment) to solvent was 0.1 g of dye (or pigment) per 2 ml of solvent. All of the dyes (or pigments) were coated on the substrates using a wire wound rod to spread the coating composition. After the coating had dried, toughness of the coating was tested by rubbing to an extent believed to be equivalent to what the coated substrate would be subjected to in ordinary handling in a commercial process.

In the following Table, all of the polypropylene and polyethylene samples were corona treated; the remaining samples were not treated.

Table

| Dye or Pigment | | Color Index Designation | Substrate Film | Coating Toughness |
|---|---|---|---|---|
| * Pigment | | | | |
| (1a) | Brilliant Blue 2GLN (Ciba-Geigy) | Solvent Blue No. 48 | Polypropylene AT-36 (Amoco) corona treated | Fair |
| (1b) | " | " | Polyethylene (Package House) corona treated | Fair |
| (1c) | " | " | PVC (Polyvinyl Chloride) | Good |
| (1d) | " | " | Polycarbonate (Lexan) (GE) | Good |
| (2a) | Yellow 2GL (Ciba-Geigy) | Solvent Yellow No. 91 | Polypropylene | Excellent |
| (2b) | " | " | Polyethylene | Excellent |
| (2c) | " | " | PVC | Excellent |
| (2d) | " | " | Polycarbonate | Excellent |
| (3a) | Orange GNG (Ciba-Geigy) | Solvent Orange No. 27 | Polypropylene | Excellent |
| (3b) | Orange GNG (Ciba-Geigy) | Solvent Orange No. 27 | Polyethylene | Excellent |
| (3c) | " | " | PVC | Excellent |
| (3d) | " | " | Polycarbonate | Excellent |
| (4a) | Auramine 0 Conc 130% (Allied Chemical) | CI 41000 | Polypropylene | Good |
| (4b) | " | " | Polyethylene | Good |
| (4c) | " | " | PVC | Good |
| (4d) | " | " | Polycarbonate | Good |
| (5a) | Victoria Green WB Conc 167% | CI 42000 | Polypropylene | Good |
| (5b) | " | " | Polyethylene | Good |
| (5c) | " | " | PVC | Good |
| (5d) | " | " | Polycarbonate | Good |
| (6a) | Rhodamine B Ex. (Ciba-Geigy) | CI 45170 | Polypropylene | Excellent |
| (6b) | " | " | PVC | Excellent |
| (6c) | " | " | Polyethylene | Excellent |
| (6d) | " | " | Cellulose acetate 912 | Excellent |
| (6e) | " | " | Cellulose triacetate | Excellent |
| (7a)* | 1,5-Diaminoanthraquinone (Aldrich Chemical Co.) | | Polyethylene | Excellent |
| (7b) | " | | Cellulose Acetate | Excellent |
| (7c) | " | | Cellulose triacetate | Excellent |
| (8a)* | 1,2-diaminoanthraquinone (Aldrich Chemical Co.) | | Polyethylene | Excellent |
| (8b) | " | | Cellulose acetate 912 | Excellent |
| (8c) | " | | Cellulose triacetate | Excellent |
| (9) | Fluorescein | CI 45350 | Polyethylene | Excellent |
| (10) | Sudan I (Aldrich Chemical Co.) | CI 12055 | Polyethylene | Excellent |
| (11)* | Black No. 1 (Shepherd Chemical Co.) | | " | Fair |
| (12)* | Yellow No. 55 (Shepherd Chemical Co.) | | " | Fair |
| (13)* | Blue No. 5 (Shepherd Chemical Co.) | | " | Fair |
| (14)* | Green No. 4 | | " | Fair |

Table-continued

| Dye or Pigment | | Color Index Designation | Substrate Film | Coating Toughness |
|---|---|---|---|---|
| (15)* | (Shepherd Chemical Co.) Violet No. 4 | | " | Fair |
| (16)* | (Shepherd Chemical Co.) Pure black iron oxide ($Fe_3O_4$-97%) | | " | Fair |
| (17)* | (Pfizer Chemical Co.) Carbon black (E. K. Levy & Sons) | | " | Fair |

The recording materials described above can also be used for material transfer other than information recording. For example, they can be used to print decorative patterns on paper or cloth.

The materials can also be used in material transfer methods which use some means of transferring other than a laser beam. A strong focused beam of light can also be used, for example. Impact printing, such as produced on a typewriter, can also be used. Although recording materials for use in impact printing do not have the same requirements with respect to stability at elevated temperatures as materials used in energy beam transfer recording, the present materials are lower in cost than ordinary typewriter ribbon compositions. Moreover, the present materials offer a wider choice of colors than can be found with ordinary typewriter ribbon materials.

We claim:

1. In a method of recording which comprises selectively irradiating with a modulated beam of electromagnetic energy one surface of a carrier film having on its opposite surface on energy transferable colorant coating so as to cause the transferable coating to vaporize and deposit on a surface of an adjacent, spaced recording element, the improvement which comprises employing as said colorant coating a binderless dry film consisting essentially of a dye of pigment of low thermal conductivity, low density, low specific heat, low vaporization temperature, small heat of vaporization and vaporizing over a temperature range of less than 30°C. and capable of absorbing sufficient energy from said electromagnetic energy beam to vaporize without decomposition and capable of being applied to said carrier film from solution or suspension in a solvent, said film being dry and binderless both prior to and during exposure to said selective irradiation.

2. A method according to claim 1 in which said carrier film is selected from the class consisting of cellulose acetate, cellulose triacetate, polyethylene, polypropylene, polycarbonate and polyvinyl chloride.

3. In a method of recording which comprises selectively irradiating with a modulated beam of electromagnetic energy one surface of a carrier film having on its opposite surface an energy transferable colorant coating so as to cause the transferable coating to vaporize and deposit on a surface of an adjacent, spaced recording element, the improvement which comprises employing as said colorant coating a film consisting essentially of a dye or pigment selected from the class consisting of Rhodamine B Ex., 1,5-diaminoanthraquinone, 1,2-diaminoanthraquinone, Yellow 2GL, Orange GNG, Auramine O, Victoria Green WB, flourescein and Sudan I.

4. In a method of recording which comprises selectively irradiating a modulated beam of electromagnetic energy one surface of a carrier film having on its opposite surface an energy transferable coating to vaporize and deposit on a surface of an adjacent, spaced recording element, selected from the class consisting of PVC and polycarbonate films, the improvement which comprises employing as said colorant coating a film of Brilliant Blue 2GL dye.

* * * * *